(12) United States Patent
Smith et al.

(10) Patent No.: US 6,587,755 B1
(45) Date of Patent: Jul. 1, 2003

(54) VIRTUAL SIGNS FOR IMPROVING INFORMATION COMMUNICATED TO THE AUTOMOTIVE DRIVER

(75) Inventors: Gordon James Smith, Rochester, MN (US); George Willard Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/614,835

(22) Filed: Jul. 12, 2000

(51) Int. Cl.7 .................................................. G06F 7/00
(52) U.S. Cl. ........................................... 701/1; 340/928
(58) Field of Search ............................... 701/1, 24, 211; 340/928, 933; 705/13

(56) References Cited

U.S. PATENT DOCUMENTS 5,485,520 A * 1/1996 Chaum et al. ................. 380/24
5,608,391 A * 3/1997 Bantli et al. ................. 340/933
5,991,689 A * 11/1999 Aito et al. ................... 701/209

* cited by examiner

*Primary Examiner*—Yonel Beaulieu
(74) *Attorney, Agent, or Firm*—Lawrence D. Maxwell; Grant A. Johnson

(57) ABSTRACT

A method and system for providing information to an individual using an electronic sign in which the sign displays information in response to the identity of the tag or an account associated with the tag. The information is displayed when the tag, which may be carried by the individual or in a vehicle, approaches the sign. A user can preselect from among various information types he wishes to receive, such as news, weather, sports and personal messages. The user can also select a priority for each information type.

28 Claims, 3 Drawing Sheets

VIRTUAL SIGNS FOR IMPROVING INFORMATION COMMUNICATED TO THE AUTOMOTIVE DRIVER

BACKGROUND OF THE INVENTION

1. Field of the Invention

The present invention relates to providing visual information to persons who are mobile, such as vehicle drivers and pedestrians.

2. Description of the Related Art

Drivers of automobiles and other road vehicles receive information from a number of sources, both internal and external to the vehicle. Internal sources include not only the vehicle's instrumentation but also the vehicle's radio and similar devices. Radio broadcasts can provide news, weather, road conditions, and similar information of use to the driver. Drivers can even receive information from the Internet using a suitably equipped device. External sources include road signs. Drivers are continually bombarded with information from road signs. Some road signs, such as signs informing the driver of the speed limit and hazards, are of critical importance to the driver. Others, such as signs informing the driver of distances to various points and signs informing the driver of rest stops and points of interest may be of lesser importance. Still others, such as advertising billboards and the like, may be of little or no interest to a particular driver.

It would be desirable to provide information to drivers by means of road signs that is consistent with an individual driver's interest in or need for that type of information. The present invention addresses these problems and deficiencies and others in the manner described below.

SUMMARY OF THE INVENTION

From one perspective, the present invention relates to a method and system for providing dynamically selected information to one or more persons using an electronic sign, in which the sign displays information in response to one or more electronic tags carried by or otherwise associated with the person or persons. The information is displayed responsive to the tag or tags being brought into proximity with the sign.

In an illustrative embodiment of the invention, the person is a driver of an automobile or other road vehicle, and the sign is located along a road. Nevertheless, in other embodiments, the person can be walking or performing any other activity that brings him and his tag into proximity with the sign. The sign can be located anywhere, including on or near a road, a bicycle path, a city street, a sidewalk, in a store window, or any other suitable location. From another perspective, the present invention relates to a method and system for providing dynamically selected information to one or more drivers of road vehicles using an electronic road sign, in which the road sign displays information in response to the identity of one or more vehicles. The identity of a vehicle may be determined not only by electronically receiving information from a tag but also by, for example, optically identifying the vehicle, optically reading indicia on the vehicle, or by any other suitable means.

The term "dynamically" refers to the feature of the invention that the selection occurs in accordance with predetermined criteria that may cause certain information to be selected under certain circumstances and other information to be selected under other circumstances. The selected information may change while the vehicle is on the road. In accordance with an illustrative embodiment of the invention, an individual vehicle or an individual driver or other occupant of a vehicle can have a tag or similar device. The tag can be electronic (either active or passive) or can be optical or of other suitable nature that allows electronic communication of information between it and another device. Many such tags can be distributed among the many vehicles or drivers on the roads. Each tag includes an identifier, such as a number, that is unique to that vehicle or individual and different from the identifiers associated with the tags of all other such vehicles or individuals The identifier is associated with an account that has been set up for that individual or vehicle. The information is selected in response to the unique identity defined or established by the tag or the account, or the information may be selected in response to a collection of tags from different vehicles by averaging characteristics associated with the tags. Information is "selected" in the sense that information of a broad range of types is available, though all types are not necessarily available in response to all identifiers at all times. For example, at any given time information describing the current weather conditions may be selected in response to one identifier, but information describing the results of sports events may be selected in response to a different identifier. The selected information is displayed on the sign as the vehicle or vehicles pass it.

It should be understood that the term "tag" is used solely for purposes of convenience in this patent specification and is not intended to convey any specific shape, package or commercially available type of electronic device. Some commercially available devices suitable for use as a tag indeed have a card-like or tag-like shape. Nevertheless, the device can have any suitable shape or size and can be co-packaged or otherwise combined with other electronic devices or with non-electronic items. For example, a conventional pager, cellular telephone, personal digital assistant (PDA), computer, wristwatch, or other electronic device or non-electronic item commonly carried on a person can be made to include a "tag" of the present invention.

In some embodiments of the invention, an individual such as the driver can preselect from among various information types. Then, information of only those types and not others will be selected and displayed when the driver passes the sign. For example, the driver can choose to view only information describing the current traffic and road conditions and can select not to view sports and weather information or other types of information. In such embodiments, a further feature of the invention can be included that allows one to select a priority for each information type. If information of two or more different priorities is available at the time the information selection is made, i.e., as the vehicle approaches the sign, information of highest priority can be selected and displayed before information of lower priority. Other criteria can be used to select from among information types in such embodiments. For example, information of a type that has not been previously selected and displayed within a predetermined amount of time can be selected and displayed before information of a type that has been more recently displayed. For example, if a driver wishes to receive sports and weather information, sports information can be selected if weather information has previously been displayed more recently than sports information.

In some embodiments of the invention, advertising or other information of general interest to more than one driver may be selected by collecting tag information from multiple persons or vehicles and dynamically selecting a message which appropriate for the collection of persons with whom the tags are associated, e.g., by selecting a message according to any of various averaging techniques for personal characteristics. Furthermore, in some embodiments, some of the information displayed is selected in response to tags, while other information is not responsive to tags.

In some embodiments of the invention, textual messages can be entered remotely and displayed on the sign. For example, a member of the driver's family can enter a message on a home computer that is connected via a wide-area network such as the global super-network presently known as the Internet. When the driver's vehicle approaches the sign, the family member's message is displayed for the driver to view.

The features described above can be included individually or combined in any suitable way in various embodiments of the invention. For example, a driver can prioritize information types so that messages from family members are given a higher priority than weather and sports information.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
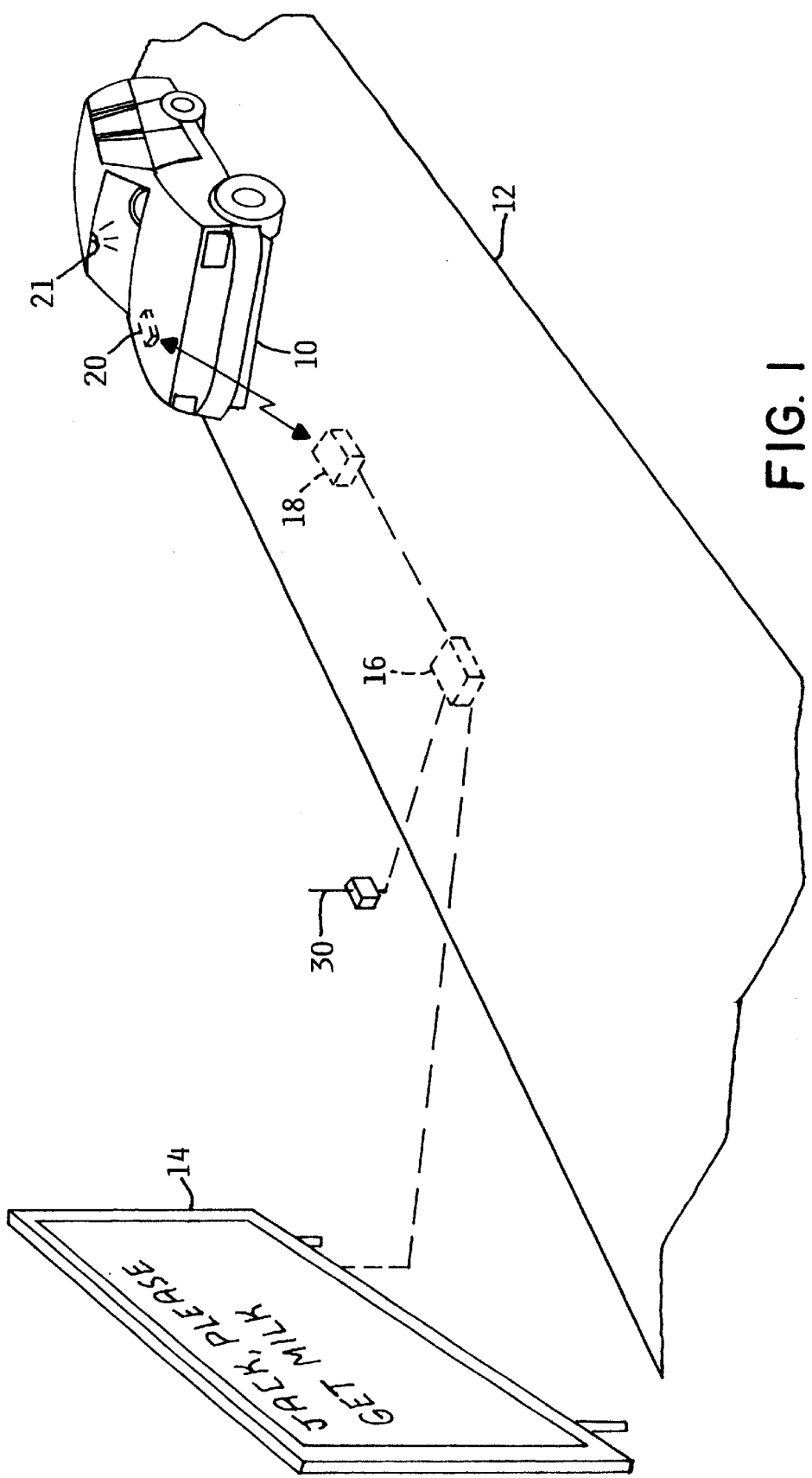
FIG. 1 illustrates a system in which an electronic road sign provides selected information to an individual driver in response to detection of the driver's approaching vehicle.

As illustrated in FIG. 1, an automobile 10 is driving along a road 12 near a system that includes an electronic sign 14, a first radio frequency identification (RFID) tag station 18, and a second RFID tag station 16. Stations 16 and 18 are preferably buried beneath the road surface to protect them from weather, vandalism and other sources of damage, but alternatively they may be located by the side of the road, suspended over the road, or in any other suitable location. The system also includes a RFID tag 20 that is preferably mounted in a convenient location inside automobile 10. Nevertheless, tag 20 may be carried on or in automobile 10 or carried by an occupant of automobile 12 in any other suitable manner. In the preferred embodiment of the invention, tag 20 is coupled to an indicator lamp 21 mounted in a location in the passenger compartment of vehicle 10 visible to the driver, such as on the dashboard or roof. RFID tag 20 is a type of device well-known in the art to which the present invention relates. Such devices communicate digital information with their associated tag stations using radio frequency (RF) electromagnetic signals when the tag is brought into close proximity with the station. (The communication range in such a system is typically no greater than a few meters, which is sufficient for purposes of the present invention.) The tag typically includes a microprocessor or similar controller, some memory, and an antenna, housed in a small card-like or tag-like enclosure. Both active and passive systems are well-known. In a typical active system, the tag and base station each transmits radio signals bidirectionally to the other, which receives and decodes them in the manner of a digital radio. In a typical passive system, the tag modulates its inductance, which is detectable when the card is in the magnetic field emanating from the base station. Such systems have been conventionally used, for example, to identify automobiles on toll roads and effect a toll payment transaction. Because tag 20 and stations 16 and 18 are well-known devices, they are not described in further detail herein.

Although RFID devices are included in this exemplary embodiment of the invention, in other embodiments the devices can be optical in nature or of any other suitable technology known in the art, such as devices that read license plates or reflectors mounted on the vehicle.

Figure 2:
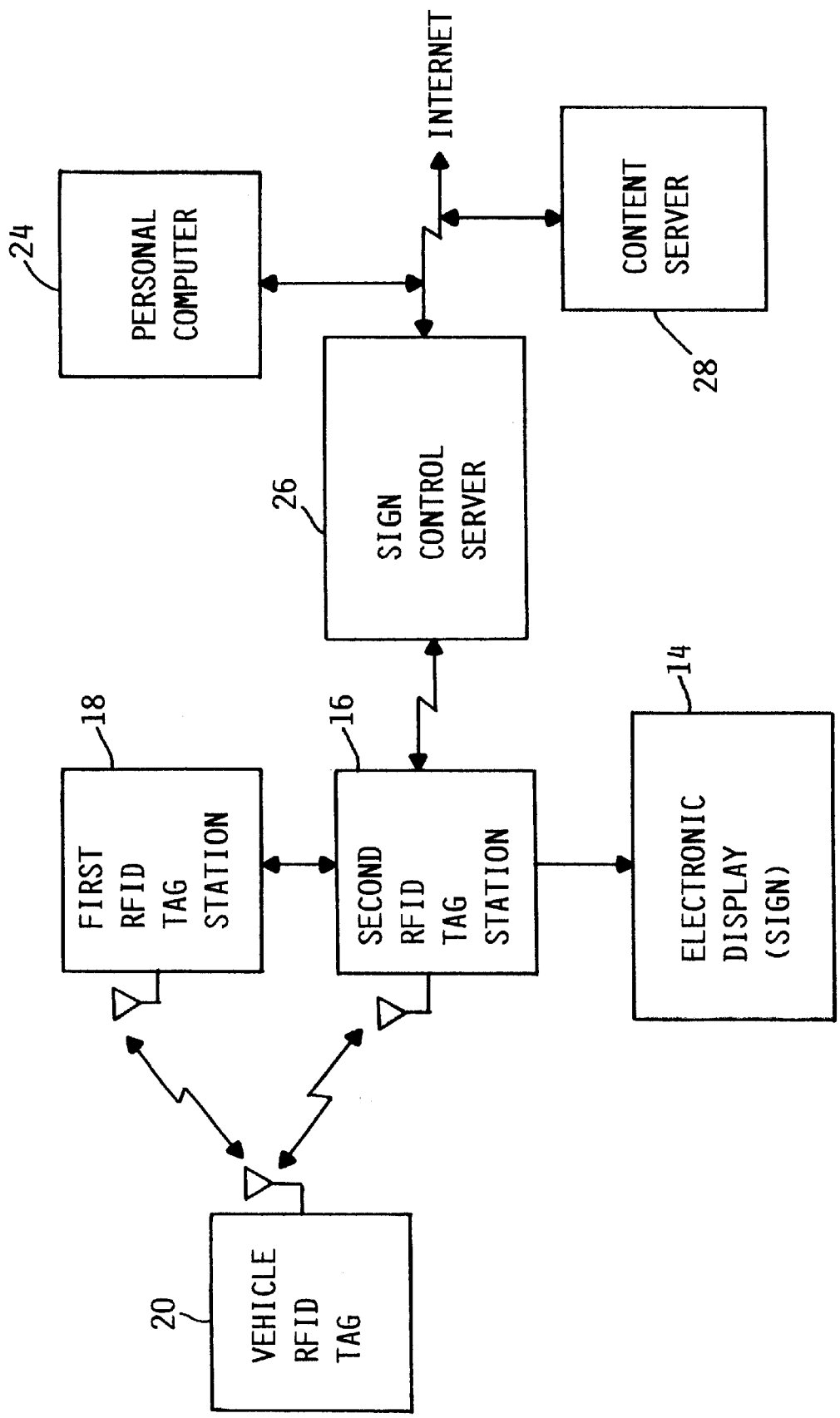
FIG. 2 is a schematic block diagram of the system.
Figure 3:
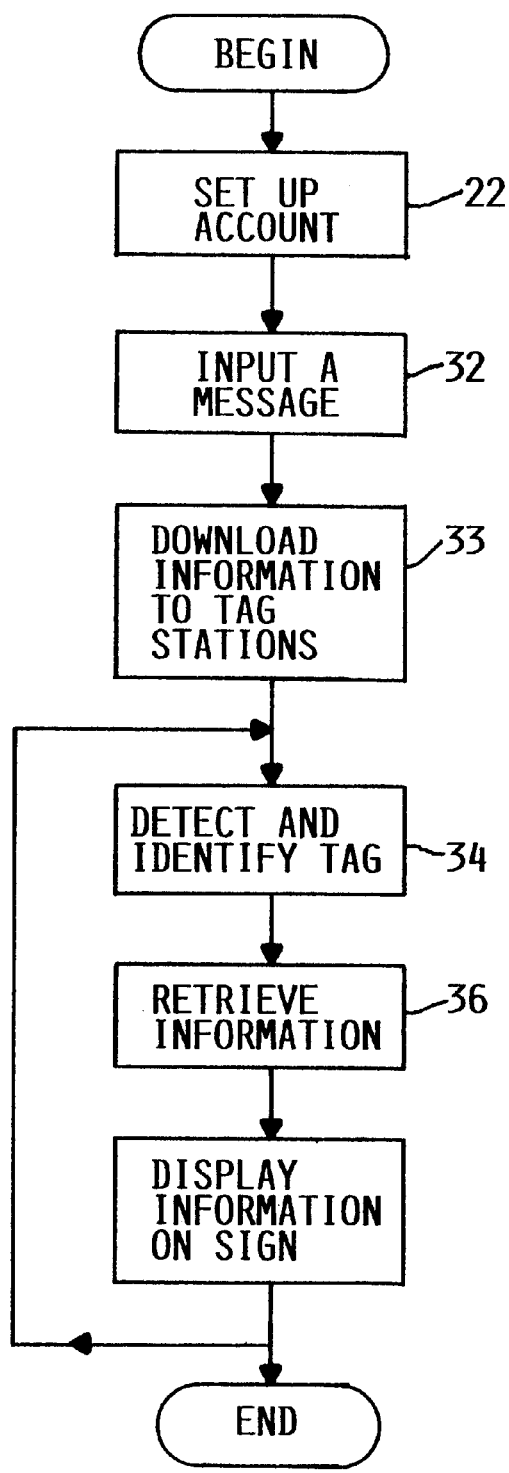
FIG. 3 is a flow chart illustrating the steps of the method for providing selected information to an individual driver by means of an electronic road sign.

The method that is performed in the above-described system is described with further reference to FIGS. 2 and 3. At step 22, a user sets up an account. The user may be, for example, the individual who normally drives automobile 10. The user can set up an account remotely from the remainder of the system using a personal computer 24 (FIG. 2) in the user's residence or workplace that is capable of communicating with a sign control server (computer) 26 via a wide-area computer network such as the global super-network commonly known as the Internet. As persons of skill in the art will recognize, FIG. 2 is simplified for purposes of illustration to omit details of the Internet interconnections and switching hardware. Note, for example, that personal computer 24 would typically be connected to the Internet via a telephone line (public switched telephone network or "PSTN") link to a service provider computer that is, in turn, connected more directly to the Internet or one of its branches. Similarly, a content server (computer) 28 is connected to the Internet for purposes described below.

Although the Internet is used to set up an account, enter messages, and so forth in this exemplary embodiment of the invention, in other embodiments a voice-response telephone system or other suitable means can be used. Such systems, in which a person enters information using a telephone keypad in response to voice prompts, are well-understood in the art to which the invention relates. The voice-response system would automatically enter the user's information into a computer such as server 26. A telephone can also be used without an automated voice-response system by having the user speak with a human operator, who manually enters the user's information into the computer.

To set up an account, the user interacts remotely with sign control server 26. Server 26 causes suitable forms (not shown) to be displayed on personal computer 24. The user enters information into these forms, identifying himself by name and providing other information typically requested by providers of Internet services, such as credit card payment information. The forms and the user's interaction with them and server 26 can conform to the standards conventionally used in that portion of the Internet known as the World Wide Web, such as the hypertext markup language (HTML) and the hypertext transfer protocol (HTTP). In addition to such typical information, the user selects types of information in which he is interested. For example, a user may be interested in receiving news information, financial information such as stock prices, weather information, sports information and traffic information. The user can rank or prioritize such information types in order of preference or importance to him. For example, he can select a higher priority for traffic information than sports information to, as further described below by way of an example, receive any relevant traffic information that he has not yet received before he receives any further sports information. Another information type that a user can select to receive is personal messages. The receipt of personal messages is also described below by way of an example.

When the user has identified himself, selected and prioritized information types, and provided other relevant information that is set forth as a request in the form presented to him, an account is established. The account preferably resides on server 26 in the form of entries in a suitable database (not shown) that reflect the information provided by the user (who is the account holder). Setting up accounts by means of hypertext forms on the World Wide Web and recording such information in a database for use by a service provider is well-known in the art and therefore not described herein in further detail. Nevertheless, it should be noted that server 26 affords the account a suitable identification number that is different from the number afforded to all other such users of the system. Any suitable number of such accounts may be set up in this manner by other individuals and each is afforded a unique identification number. Payment for the service described herein can be effected in any suitable manner known in the art for payment of Internet-based services or services ordered via the Internet. For example, the user may pay a monthly fee by means of a credit card. When the user has set up an account, the user receives tag 20. The provider of the services, who may be the operator of server 26 or have a business association with the operator of server 26, can mail tag 20 to the user or provide it in any other suitable manner, such as requiring the user to drive automobile 10 to a certain place of business so that the provider can install tag 20 in automobile 10. Tag 20 is preferably pre-programmed with information relating to the user's account. For example, the unique identification number is preferably stored in the memory of tag 20.

Sign control server 26 is preferably remotely located from the remainder of the system at a location where a high-speed Internet connection is readily available. Server 26 is connected to second RFID tag station 16 via a suitable telephone connection, such as a hard-wired connection to the PSTN or a cellular telephone link to the PSTN. The antenna 30 for such a cellular telephone link is shown in FIG. 1.

With reference again to FIG. 3, at step 32 another individual can use personal computer 24 or a computer similarly connected to the Internet to communicate a text message to sign control server 26. Step 32 is optional in the sense that it can occur only if at the time set up his account the user selected personal messages as an information type to receive. If the user did not select personal messages as an information type, step 33 is the next step of the method.

At step 33 information is selected for the one or more users of the system and downloaded into the computers of the one or more second RFID tag stations 16 associated with the one or more electronic signs 14 of the system. Selection is performed by sign control server 26 in accordance with a suitable algorithm. Depending upon whether the embodiment of the invention allows the user to select from among more than one information type and whether it allows the user to prioritize them, the algorithm can be as straightforward as retrieving (i.e., downloading) information stored on remote content server 28. For example, in some embodiments of the invention, news information may be stored on content server 28. Sign control server 26 thus retrieves the news information from server 28. The types of information stored on Internet servers and remotely retrievable by other (client) computers connected to the Internet is broadly referred to in the art as "content." An enormous variety of content servers and methods for creating, selecting and delivering such information (content) to client computers are well-known in the art and therefore not described in detail herein. The content delivered to server 26 may be any suitable content that is known in the art to be deliverable via the Internet, including news information, financial information, weather information, sports information, traffic information and e-mail-like personal text messages.

Sign control server 26 performs this algorithm for each user of the system, i.e., for each account. Sign control server 26 downloads the retrieved information for each user into the computer of each second RFID tag station 16 of the system (or at least into the computer of each station 16 in the geographic region where that user is expected to be). The information is thus ready for immediate retrieval and display when the user approaches sign 14. Although some or all of the information to be displayed is preferably pre-stored in this manner, in other embodiments of the invention the information can be downloaded at the time the user approaches sign 14.

Operation of the system begins at step 34 when automobile 10 drives down road 12 into sufficient proximity with first RFID tag station 18 for communication with RFID tag 20 to occur. At that time, RFID tag 20 automatically identifies itself to first RFID tag station 18 by communicating the identification number stored in it to first RFID tag station 18. First RFID tag station 18 in turn communicates the identification number to second RFID tag station 16. Second RFID tag station 16 is preferably located a short distance (e.g., 100 meters) down road 12 from first RFID tag station 18. A computer in second RFID tag station 16 compares the received identification number with the numbers it stores internally that uniquely identify the accounts. If the received identification number matches one associated with one of the accounts, at step 36 second RFID tag station 16 retrieves the information that has been pre-stored in its computer for the driver or other occupant of automobile 10. When automobile 10 comes into sufficiently close proximity with tag station 16, tag station 16 detects and causes tag 20 to be identified in the same manner described above. When tag station 16 detects and identifies tag 20, it causes electronic sign 14 to display the retrieved information for that user at step 38.

In the illustrated example, the information or content to be displayed for the user is the personal message entered into personal computer 24 at step 32. For example, the spouse of the driver of automobile 10 may wish to communicate a message asking the driver to buy some milk on his way home from work. For example, the message can be: "Jack, please get milk." Examples of other information or content include pictures, diagrams and the like. For example, Jack's brother could send Jack, who may be stuck in traffic, a picture of his newborn child.

When tag 20 is detected and identified, first tag station 18 causes-indicator lamp 21 inside automobile 10 to be activated. Indicator lamp 21 alerts the driver to divert some of his attention to sign 14. Alternatively to indicator lamp 21, the indicator device can be an audible buzzer or any other suitable device. Preferably, indicator lamp 21 or such other device is activated even if sign 14 is unable to display the information, so that the driver knows there is information intended for him. Sign 14 may be unable to display information if, for example, it or its network connections malfunctions.

Electronic sign 14 is preferably similar in size and shape to other road signs and has a suitable electronic display, such as a rectangular array of lamps, that can display text and graphics, including pictures. Sign 14 then displays the received content. As illustrated in FIG. 1, sign 14 displays the message "Jack, please get milk." The driver of automobile 10 can read this message as he drives by. A few seconds after automobile 10 has passed, i.e., after tag station 16 no longer detects tag 20 in proximity, tag station 16 normally causes the message or other content to disappear or be erased from sign 14. After the message has been displayed on sign 14, tag station 16 can initiate transmission of a notification message (e.g., an e-mail) to that effect to the person who sent the message.

Note that, with respect to the accounts that have already been set up, the process returns to step 34, implying that another automobile having a tag of the present invention (not shown) can pass sign 14 and have information displayed in the same manner as described above with respect to automobile 10. It is also implied that automobile 10 can pass another sign (not shown) further down the same road or elsewhere and again have information displayed in the manner described above.

Although normally the information is displayed for some predetermined amount of time, if another driver having a tag of the present invention (not shown) is detected approaching sign 14 before that amount of time has passed, tag station 16 causes the earlier displayed information to be erased, retrieves information directed to the other (next) driver, and causes sign 14 to display that retrieved information. More complex algorithms for determining which of multiple drivers in the vicinity of sign 14 should have information displayed for them will readily occur to persons skilled in the art to which the invention pertains. For example, if two (or more) drivers approach sign 14 relatively closely to one another, the algorithm may involve comparing the priority of the information directed to each driver with the priority of the information directed to the other drivers. Thus, one driver may receive a high-priority urgent or emergency message even though his tag is detected a second or two after the tag of another driver if the other driver's information is of lower priority, such as news or weather reports. Alternatively or in addition, the algorithm may involve comparing the speed of two or more vehicles. Speed can be measured in response to the time elapsed between detection of the tag by first tag station 18 and detection of the same tag by second tag station 16. Thus, information directed to a driver whose automobile is traveling faster than that of other drivers may be displayed because the faster driver will have less time to view the information than the slower drivers. Note that the speed measurement itself can be information displayed for a driver.

In some embodiments of the invention, the electronic sign can have multiple portions so that information directed to multiple drivers can be displayed simultaneously. For example, one portion of the sign can be directed to truckers while another is directed to drivers of automobiles. The sign can display any suitable number of messages simultaneously.

Sign 14 can display messages or other information in colors that correspond to their priorities. For example, it can display high-priority information in red, lower-priority in blue, and so forth. Also note that the information can be not only textual in nature but also graphical, including still images and moving images.

With further regard to step 33, although not indicated in the flowchart of FIG. 3 for purposes of clarity, sign control server 26 can select information and download it into the computer of second tag station 16 as often as may be determined by a predetermined algorithm. For example, the algorithm can be that new information directed to the driver of automobile 10 is selected and downloaded into tag station 16 only after old information has been displayed for that driver. Alternatively, the algorithm can be that information is selected and downloaded at predetermined time intervals. Many other algorithms are possible, such as updating information stored in second tag station 16 when the information becomes stale, outdated or no longer of use to the driver for which it is intended. In other words, server 26 can, for example, read a news headline from content server 28 but download it into tag station 16 only when the headline has changed from a headline previously downloaded into tag station 16. Such other algorithms will readily occur to persons skilled in the art to which the invention relates in view of the teachings in this patent specification.

In embodiments of the invention in which the user's account prioritizes two or more information types, at step 33 server 26 selects information of one type and not the others as the content to be displayed. Server 26 can use any suitable prioritization algorithm. For example, if the user selects traffic information and sports as information types and selects a higher priority for traffic information than sports, server 26 can determine how long ago it last retrieved traffic information for the user of the identified account (i.e., the last time automobile 10 passed an electronic sign system of the present invention) and how long ago it last retrieved sports information for the user of the identified account. It can then retrieve the traffic information from, for example, content server 28, and compare the retrieved traffic information to traffic information it last retrieved. If the retrieved information is the same as that which it last retrieved, i.e., the traffic information has not changed since the last time, server 26 can retrieve sports information from content server 28 or another such server. If the traffic information has changed, however, it is displayed instead of sports information because it has a higher priority than sports information and the driver has presumably not yet seen the new traffic information. Alternatively, server 26 can retrieve information of a certain type if information of that type has not been previously retrieved for the user of the identified account within a predetermined amount of time, such as the past two hours. If information of that type has been retrieved within the past two hours for the identified account, information of a lower-priority type will be retrieved instead.

In typical scenarios, a user may afford personal messages the highest priority. Indeed, different types of personal messages can be afforded different priorities. For example, personal messages of an "emergency personal message" information type can have a higher priority than personal messages of a "personal request message" information type. In the illustrated example, the personal message "Jack, please get milk" may be displayed because personal messages have a higher priority than other information types the user selected, such as weather, sports and financial information. The user may have selected these information types in order of decreasing priority: personal messages, weather, sports and financial information. Thus, weather information would be retrieved only if no new personal messages have been entered. Similarly, sports information would be retrieved only if no new personal messages or weather information is available. Financial information would be retrieved only if no new personal messages, weather information or sports information is available. Also, at any given time, information of one or more of the selected types may simply be unavailable due, for example, to a malfunctioning content server or inattention by content providers to store such content on their servers. In such cases, information of a type having lower priority than the unavailable information would be displayed. Information could also include advertising, which could be interspersed with other information or displayed whenever no higher priority information is specified.

Tag 20 may be associated with the occupant of automobile 10 or may be associated with automobile 10 itself. In other words, although the account is preferably personalized for the driver or other occupant, it may be set up in association with the vehicle, e.g., automobile 10, with the intention that the messages are not directed to a particular individual but rather to any driver or other occupant of the vehicle. Such embodiments of the invention may be particularly useful for drivers of commercial vehicles in which the vehicle may have different drivers at different times. Operators of commercial trucking lines may, for example, wish to provide their drivers with traffic information or road conditions or send personal messages to them instruction them how to proceed. In a further alternative embodiment, information displayed dynamically may be directed to multiple persons (e.g., in multiple vehicles) by receiving multiple tags from a group of persons or vehicles and displaying a message appropriate to the group. For example, on a busy freeway, it may be impractical to display messages for each individual driver. However, a system as described herein could receive tags from a number of vehicles approaching the electronic sign more or less to concurrently over some time interval, e.g., 60 seconds. Based on this collection of tags, the system could abstract some characteristic or characteristics of the group of vehicles, and choose an appropriate message. Such an embodiment would be useful, e.g., for dynamically displaying advertising targeted to the group. The tag may show a predominance of drivers of a particular age, sex, income, educational level, political affiliation, area of interest, or other characteristic, and select an advertisement or other message targetted to the group. It will be understood that the message will not necessarily be appropriate for every driver or vehicle occupant in the group, but that some sort of averaging algorithm would be used to identify a characteristic or characteristics of a majority or significant number of people in the group, and choose a message based on this information (analogous to the manner in which magazine advertisers choose publications in which to place their ads based on the known demographics of the subscribers). Furthermore, such a method of selecting advertising based on group demographics could be used in conjunction with a system of individualized messages as described earlier. I.e., individualized messages may have a higher priority, but where there is no individualized message of a high priority to be displayed, the system may select an advertising or other general interest message based on group characteristics.

In the embodiments described above, information is displayed in response to a tag from one person or vehicle, or to multiple tags from a group of people or vehicles. However, in a further alternative embodiment, some of the information could be information of general interest which is not selected in response to any tag, while other information is selected in response to tags. For example, there may be a certain class of high priority information, such as an emergency news flash or weather alert, which pre-empts all other information. As an additional example, general information such as advertising which is not selected in response to tags could be displayed on a low priority basis, to be interrupted by higher priority personal messages and other tag-selected information when such higher priority information is available. As a further example, portions of an electronic sign could be devoted to tag-selected information, while other portions are devoted to information of general interest, which is not selected in response to tags.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for providing information to an individual with whom an electronic tag is associated using an electronic sign, said electronic sign having a dynamic display, comprising the steps of:

establishing an account associated with said tag;

receiving an information selection from said individual;

selecting information in response to an identity of said account and said information selection;

electronically detecting said tag being brought into proximity with said electronic sign;

electronically determining an identity of said tag being brought into proximity with said electronic sign;

retrieving said information selected in response to said identity of said account if said identity of said account matches said identity of said tag; and displaying retrieved information on said dynamic display.

2. A method for providing information to an occupant of a road vehicle using an electronic road sign, said electronic road sign having a dynamic display, comprising the steps of:

receiving from the occupant a prioritization of information types, said prioritization ranking information types in order of said occupant's preference;

electronically detecting at least one vehicle approaching said electronic road sign;

electronically determining a respective identity of at least one identifier associated with said at least one vehicle;

selecting information in response to said respective identity of at least one identifier and said prioritization; and displaying said selected information on said dynamic display.

3. The method claimed in claim 2, wherein:

said step of electronically detecting at least one vehicle approaching said electronic road sign comprises communicating a radio frequency signal between a respective device in said at least one vehicle and a device associated with said road sign; and said step of electronically determining a respective identity of at least one identifier associated with said vehicle comprises communicating a radio frequency signal between a respective device in said at least one vehicle and a device associated with said road sign.

4. The method claimed in claim 3, further comprising the steps of:

prior to said steps of electronically detecting at least one vehicle and electronically determining said identity of at least one identifier, said occupant providing a base station computer located remotely from said road sign with said prioritization of information; and communicating information from said base station computer to said road sign;

wherein said step of selecting information comprises selecting information of one of said information types.

5. The method claimed in claim 4, wherein said step of selecting information of one of said information types comprises the steps of:
   determining an amount of time elapsed since previously selecting information of one of said information types; and
   selecting information of a type not previously selected within a predetermined amount of time.

6. The method claimed in claim 4, wherein said step of selecting information of one of said information types comprises the steps of:
   determining whether information of one of said information types is not available; and selecting information of a type that is available but of lower priority than information of a type that is not available.

7. The method claimed in claim 3, wherein:
   said step of selecting information in response to said identity comprises selecting said information at a base station computer located remotely from said road sign; and
   said step of displaying information on said dynamic display comprises communicating selected information from said base station computer to said road sign.

8. The method claimed in claim 7, further comprising the step of, prior to said steps of electronically detecting at least one vehicle and electronically determining an identity of at least one identifier, providing said base station computer with a textual message, wherein said information selected in response to said identity includes said message and information displayed on said dynamic display includes said message.

9. The method claimed in claim 8, wherein said step of providing said base station computer with a textual message comprises the step of entering said textual message into a computer in communication with said base station computer via a wide-area computer network and located remotely from said base station computer.

10. The method claimed in claim 7, further comprising the step of, prior to said steps of electronically detecting a vehicle and electronically determining an identity of an identifier, establishing an account associated with said vehicle on said base station computer in exchange for a predetermined payment.

11. The method claimed in claim 2, wherein said step of selecting information in response to the respective identity of at least one identifier comprises selecting information in response to at least one characteristic associated with a plurality of said identifiers.

12. A system for providing information to an occupant of a road vehicle, comprising:
   an electronic road sign having a dynamic display;
   a receiver apparatus for receiving electronically detectable tags, each tag being borne by a respective vehicle approaching said electronic road sign; and
   a programmable processor coupled to said receiver apparatus and to said electronic road sign, said processor being programmed to receive a prioritization of information types from said occupant, to select information in response to at least one said electronically detectable tags and said prioritization, and to cause said information to be displayed on said dynamic display when the at least one vehicle bearing the at least one said electronically detectable tags approaches said road sign.

13. The system claimed in claim 11, wherein a radio frequency signal is communicated between said receiver apparatus and said tag to electronically detect said tag.

14. The system claimed in claim 12, further comprising a base station computer located remotely from said road sign, wherein said occupant provides said base station computer with the prioritization of information types in order of said occupant's preference, and wherein said information is selected from one of said information types and communicated from said base station computer to said road sign.

15. The system claimed in claim 13 wherein said base station computer determines an amount of time elapsed since previously selecting information of one of said information types and selects information of a type not previously selected within a predetermined amount of time.

16. The system claimed in claim 13, wherein said base station computer determines whether information of one of said information types is not available and selects information of a type that is available but of lower priority than information of a type that is not available.

17. The system claimed in claim 12, further comprising a base station computer located remotely from said road sign, wherein selected information is communicated from said base station computer to said road sign.

18. The system claimed in claim 16, wherein said base station computer is part of a computer system having an input device for receiving a textual message, wherein said information selected in response to said identity includes said message and said information displayed on said electronic road sign includes said message.

19. The system claimed in claim 17, wherein said computer system includes a wide-area network, and said textual message is entered into a computer in communication with said base station computer via said wide-area computer network and located remotely from said base station computer.

20. The system claimed in claim 12, wherein said programmable processor is programmed to select information in response to at least one characteristic associated with a plurality of said tag.

21. The method of claim 1, wherein the information comprises travel information.

22. The method of claim 1, wherein the information comprises road conditions.

23. The method of claim 1, wherein the information comprises advertisements.

24. The method of claim 23, further comprising selecting the advertisements to be displayed based on the individual in close proximity to the electronic sign.

25. The method of claim 1, wherein the tag comprises a personal digital assistant having an identifier associated therewith.

26. The method of claim 1, wherein the tag comprises a cellular telephone having an identifier associated therewith.

27. The method of claim 1, wherein the tag comprises a pager having an identifier associated therewith.

28. A method for providing dynamic information, comprising:
   associating a tag with an individual;
   receiving a desired information selection from the individual;
   detecting the tag as being in close proximity to an electronic sign, the electronic sign having a dynamic display; and
   in response to detecting the tag:
      determining the identity of the tag;
      receiving the desired information associated with the identified tag; and
      displaying the information on the dynamic display.

* * * * *